Feb. 16, 1932.　　　　J. W. WRIGHT　　　　1,845,110
CRANKSHAFT FOR USE IN GASOLINE MOTORS
Filed May 25, 1929　　　2 Sheets-Sheet 1

INVENTOR
BY John Walter Wright
ATTORNEY

Feb. 16, 1932.  J. W. WRIGHT  1,845,110
CRANKSHAFT FOR USE IN GASOLINE MOTORS
Filed May 25, 1929  2 Sheets-Sheet 2
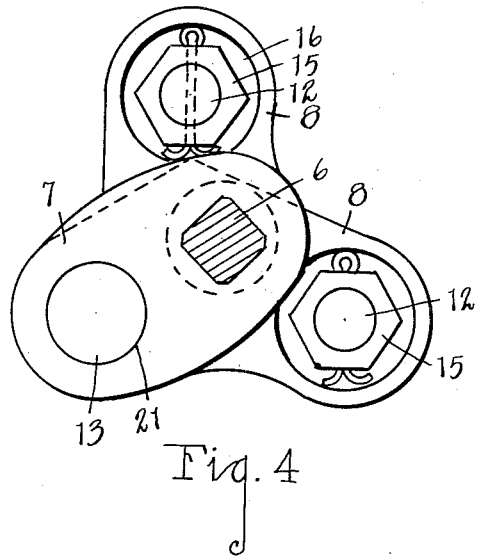
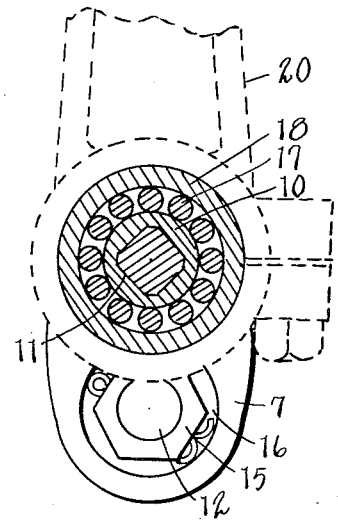
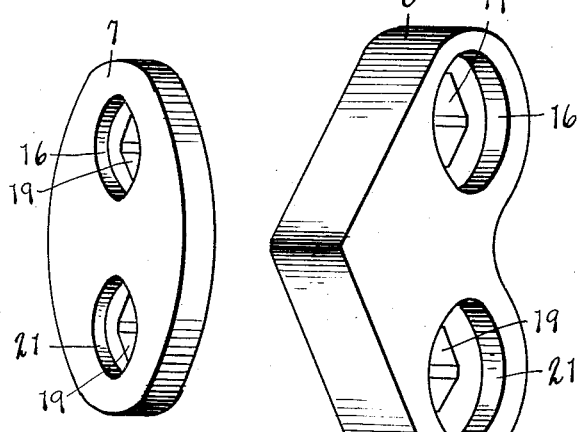
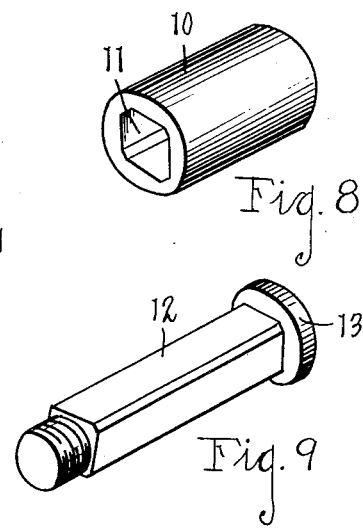
INVENTOR
John Walter Wright Patented Feb. 16, 1932

1,845,110

UNITED STATES PATENT OFFICE

JOHN WALTER WRIGHT, OF PAW PAW, MICHIGAN

CRANKSHAFT FOR USE IN GASOLINE MOTORS

Application filed May 25, 1929. Serial No. 365,933.

The invention relates to improvements in gasoline motor crankshafts in which the crankshaft is made up of assembled parts held together by bolts and the main crankshaft bearings and connecting rod bearings are to operate in roller bearings, and the main objects of the improvements are, 1—To provide a crankshaft that can be manufactured from assembled parts instead of from one solid piece of metal and thereby reduce manufacturing costs;

2—To provide a crankshaft in which parts may be replaced when necessary instead of demanding an entire new crankshaft in case replacement is necessary;

3—To provide a crankshaft in which the assembling is reduced to a minimum of simplicity;

4—To construct a crankshaft whereby the maintenance cost can be reduced to a minimum.

Figure 4 is a cross section taken when looking in the direction of the line 4—4 of Figure 1. The end support is shown in section.

Figure 5 is a cross section of one of the bearings looking in the direction of the arrows on the line 5—5 of Figure 1.

Figure 6 is a perspective view of one of the four members on the crankshaft.

Figure 7 is a perspective view of one of the four opposing members of the throw of the crankshaft.

Figure 8 is a perspective view of the spacer member.

Figure 9 is a perspective view of one of the bolts.

Figure 1:
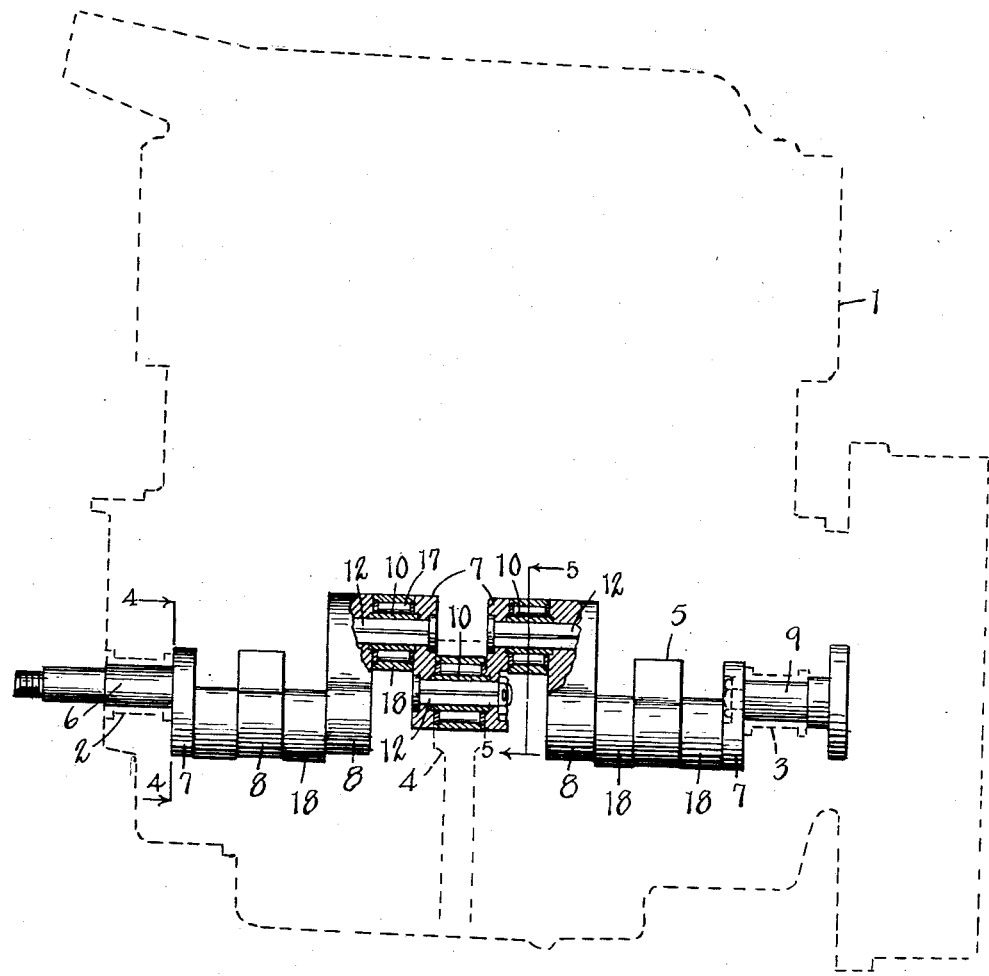
Figure 1 is a conventional illustration of a motor with my improved crankshaft. Parts are shown in section for convenience in illustrating.
Figure 2:
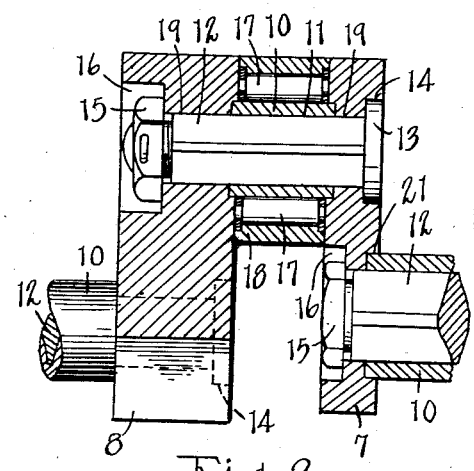
Figure 2 is a sectional view of the crank throw which is typical throughout the shaft.
Figure 3:
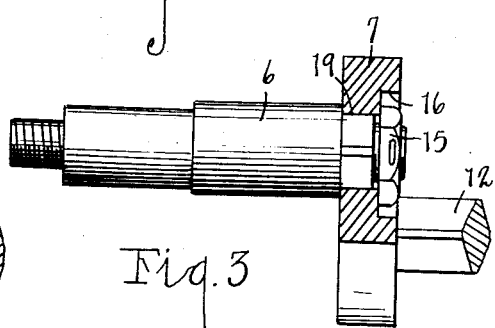
Figure 3 is a partial sectional view showing the end support attached to one of the throws.

The details of the invention are described in the following specifications in which (1) is a motor having end bearings (2 and 3) and a center bearing (4). The crankshaft (5) is a composition of an end support (6), a throw member (7), an opposing member (8) and an end support (9). The crank throws consist of spacers (10) having square bores (11) for the reception of the square shanks (12) of the bolt. The heads of said bolts are countersunk in the counterbores (14) and the clamping nuts (15) are counter sunk in recesses (16). The spacer member consists of the inner race (10) embracing the bolt and having its ends supported in recesses (21). The roller bearings have rollers (17) and an outer race (18). The cranks have square bores (19) for all the crank pins (12) which have square shanks for alinement of the cranks, thereby eliminating the necessity of keys. The connecting rod (20) is shown secured to one of the roller bearings. With parts thus arranged, I have constructed a crankshaft that can be easily assembled with roller bearings. The maintenance cost has been cut to a minimum as repairs can be made easily without the removal of a complete crankshaft from the motor. With the parts secured together by the square crank pins and in proper alinement, a very rigid shaft has been assembled.

The various parts of the crankshaft may be removed from the motor by taking out the bolt shaft and without taking out the entire crankshaft and a new part may be so replaced therein.

I claim:

In a device of the class described, two opposed throw members having alined square openings therethrough, an inner and an outer recess at the opposite ends of each of said openings, a cylindrical spacer fitting between the throw members and snugly engaging the opposed recesses in the throw members, said spacer having a square opening therethrough in alinement with the openings in the throw members, a bolt, said bolt having a square shank passing through the alined openings and threaded at one end and a head on the other end, said head resting in the outer recess of the opening in one of the throw members and a nut engaging the threaded end of the bolt, said nut resting in the outer recess of the opening in the other of the throw members.

JOHN WALTER WRIGHT.